(12) United States Patent
Yasumura et al.

(10) Patent No.: US 11,158,445 B2
(45) Date of Patent: Oct. 26, 2021

(54) PERMANENT MAGNET FOR ROTATING ELECTRICAL MACHINE, ROTATING ELECTRICAL MACHINE, METHOD FOR PRODUCING PERMANENT MAGNET FOR ROTATING ELECTRICAL MACHINE

(71) Applicant: KABUSHIKI KAISHA YASKAWA DENKI, Kitakyushu (JP)

(72) Inventors: Takaaki Yasumura, Kitakyushu (JP); Yasuhiro Miyamoto, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 1064 days.

(21) Appl. No.: 15/717,945

(22) Filed: Sep. 28, 2017

(65) Prior Publication Data

US 2018/0268976 A1    Sep. 20, 2018

(30) Foreign Application Priority Data

Mar. 16, 2017    (JP) .............................. JP2017-051766

(51) Int. Cl.
*H01F 7/02* (2006.01)
*H02K 1/27* (2006.01)
(Continued)

(52) U.S. Cl.
CPC .............. *H01F 7/02* (2013.01); *H01F 7/021* (2013.01); *H01F 13/003* (2013.01); *H01F 41/0253* (2013.01); *H02K 1/276* (2013.01); *H02K 1/2746* (2013.01); *H02K 1/2766* (2013.01); *H02K 2213/03* (2013.01)

(58) Field of Classification Search
CPC ........ H01F 7/02; H01F 7/021; H01F 41/0253; H01F 13/003; H02K 1/2766; H02K 1/2746; H02K 1/276; H02K 2213/03; H02K 1/06; H02K 1/278; H02K 15/00; H02K 15/03
See application file for complete search history.

(56) References Cited

U.S. PATENT DOCUMENTS 6,606,019 B1 *   8/2003   Ohashi .................. H01F 1/0577
                                                          335/302
10,242,783 B2 *  3/2019   Smith .................... H01F 7/0278
(Continued)

FOREIGN PATENT DOCUMENTS

JP       11-98729 A      4/1999
JP       2001-78402      3/2001
(Continued)

OTHER PUBLICATIONS

Description JP2002345189A.*
(Continued)

*Primary Examiner* — Mohamad A Musleh
(74) *Attorney, Agent, or Firm* — Mori & Ward, LLP

(57) ABSTRACT

A permanent magnet for a rotating electrical machine includes a magnet body. The magnet body includes a magnetization direction, a first side surface and a second side surface opposite to the first side surface in a first direction perpendicular to the magnetization direction, and at least one first slit passing through the magnet body in the magnetization direction. The at least one first slit extends in the first direction to the first side surface and not to the second side surface.

9 Claims, 12 Drawing Sheets

(51) Int. Cl.
    *H01F 41/02*    (2006.01)
    *H01F 13/00*    (2006.01)

(56)            References Cited

U.S. PATENT DOCUMENTS

2007/0017601 A1    1/2007    Miyata et al.
2014/0245597 A1*   9/2014    Doi ..................... H02K 15/03
                                                        29/598

FOREIGN PATENT DOCUMENTS

JP        2002-345189        11/2002
JP         2005-20874 A       1/2005
JP        2006-238565 A       9/2006
JP        2007-053351         3/2007

OTHER PUBLICATIONS

Japanese Office Action for corresponding JP Application No. 2017-051766, dated Feb. 8, 2018.
Japanese Office Action for corresponding JP Application No. 2017-051766, dated Aug. 16, 2018.
Japanese Office Action for corresponding JP Application No. 2017-051766 , dated Mar. 5, 2019 (w/ machine translation).
Chinese Office Action for corresponding CN Application No. 201710851438, dated Sep. 12, 2019 (w/ machine translation).
Japanese Office Action for corresponding JP Application No. 2017-051766, dated Oct. 1, 2019 (w/ machine translation).

* cited by examiner

[FIG. 1]
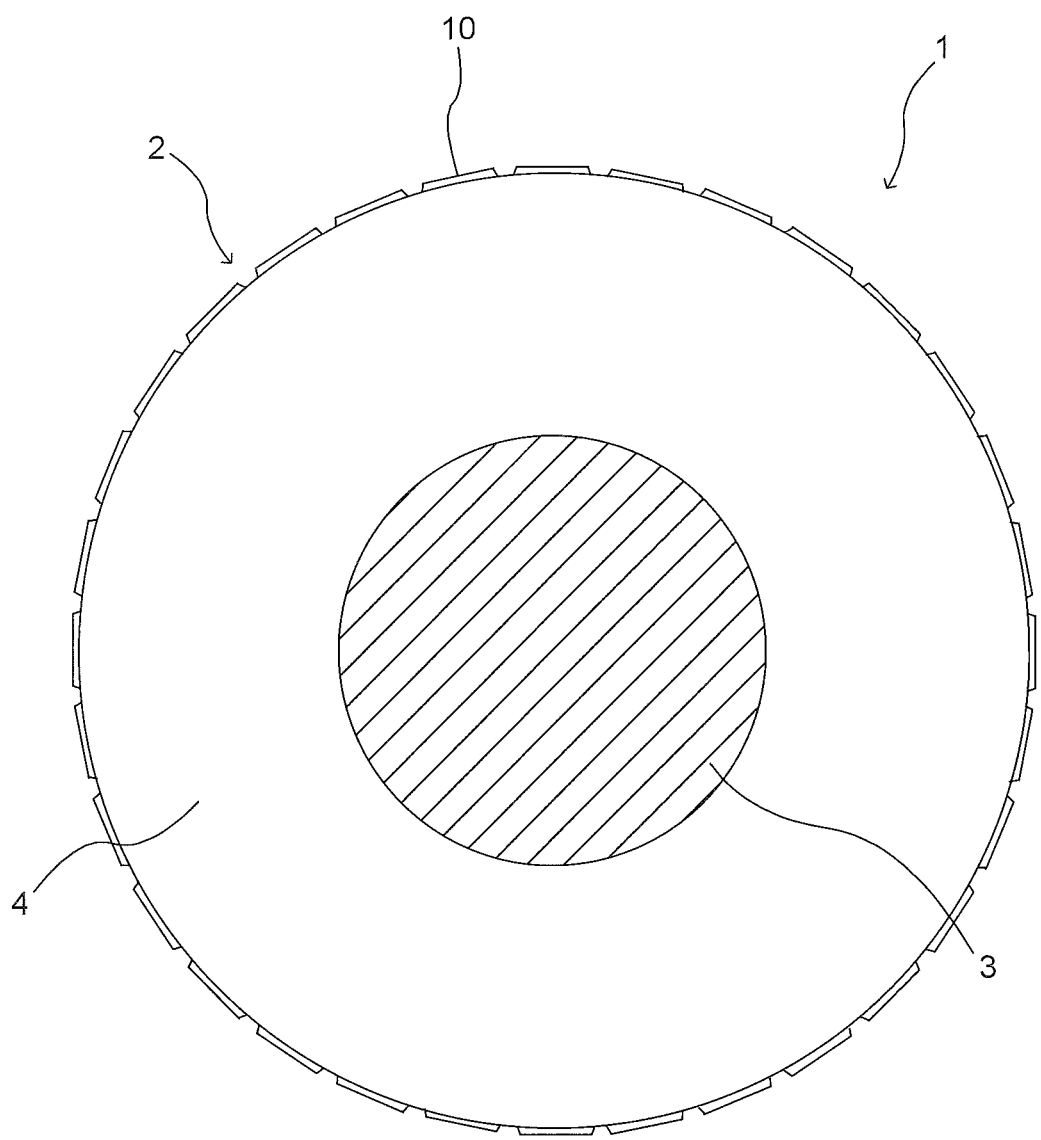

[FIG. 2]
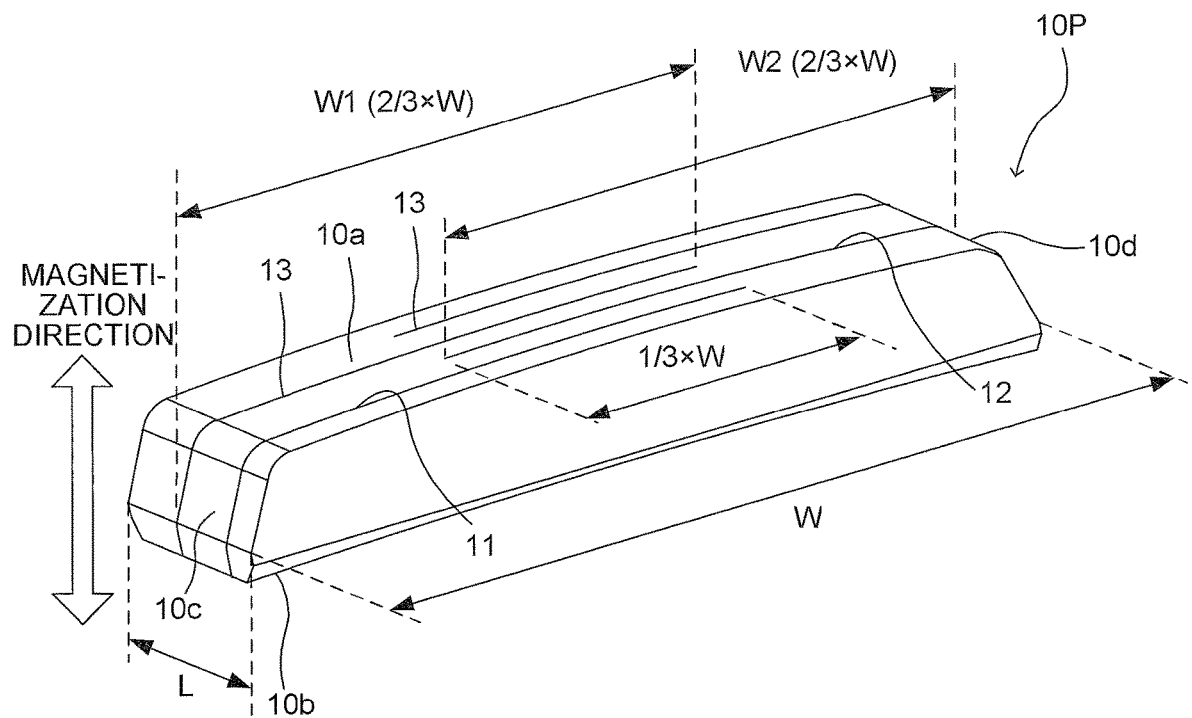
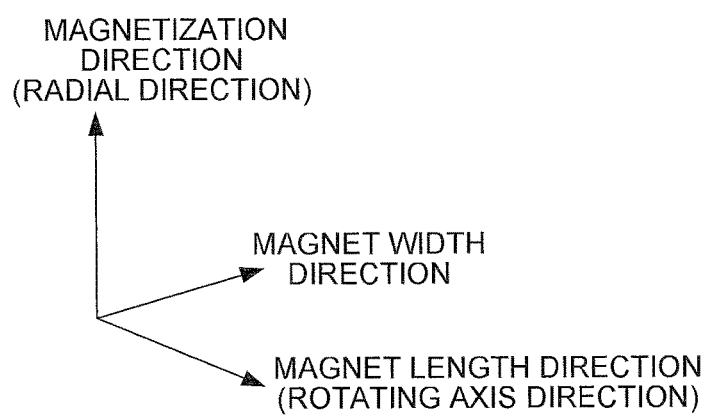

[FIG. 3A]
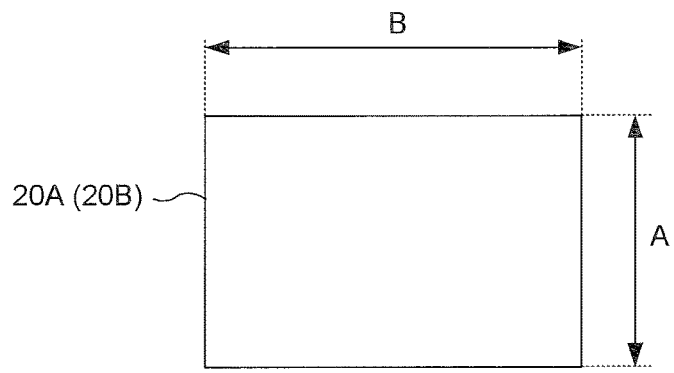
[FIG. 3B]
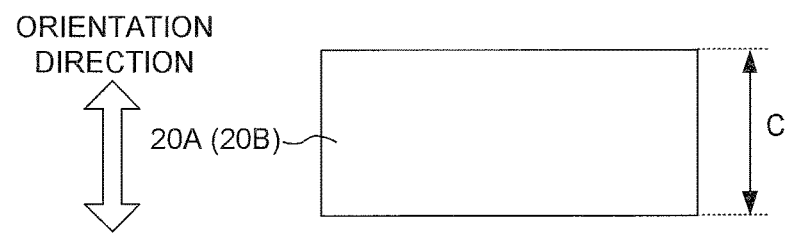
[FIG. 4A]
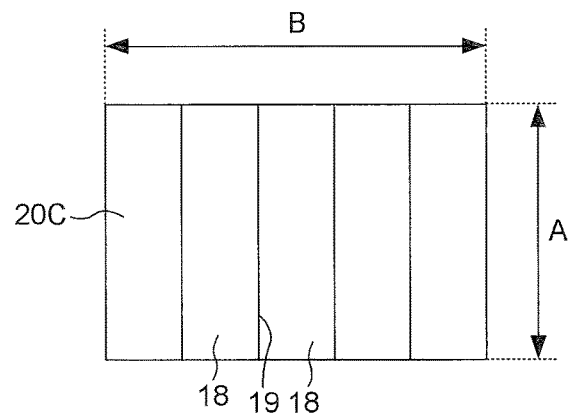
[FIG. 4B]
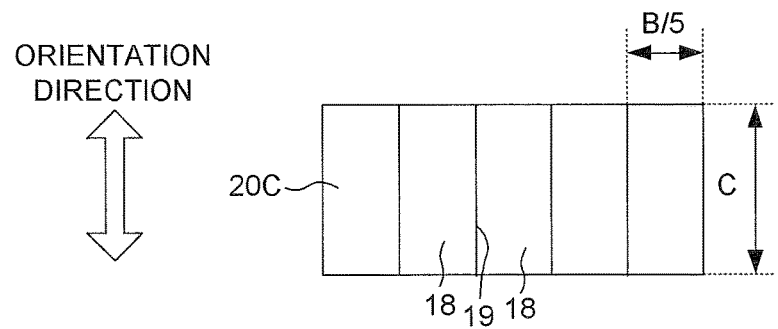

[FIG. 5A]
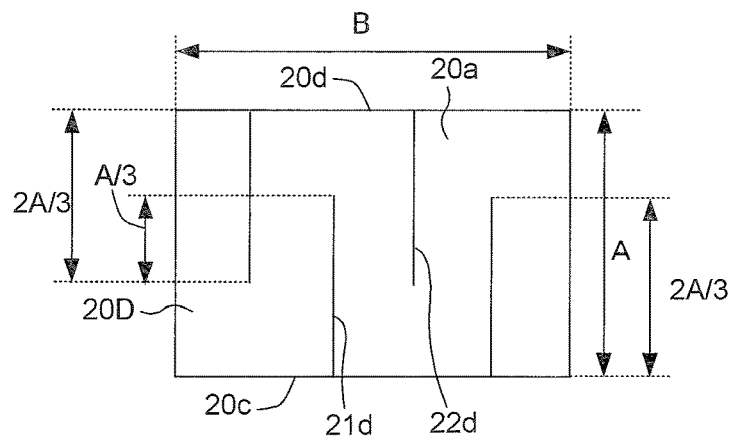
[FIG. 5B]
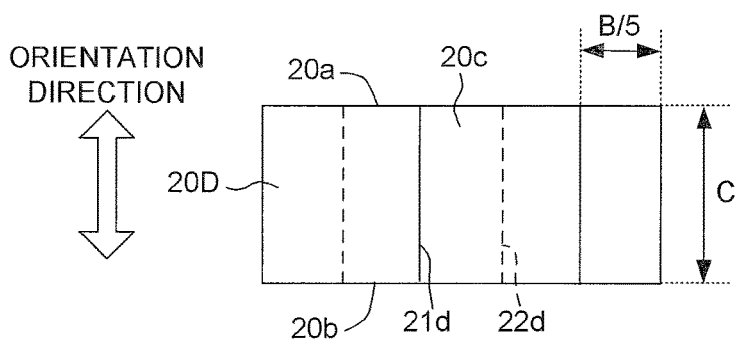
[FIG. 6A]
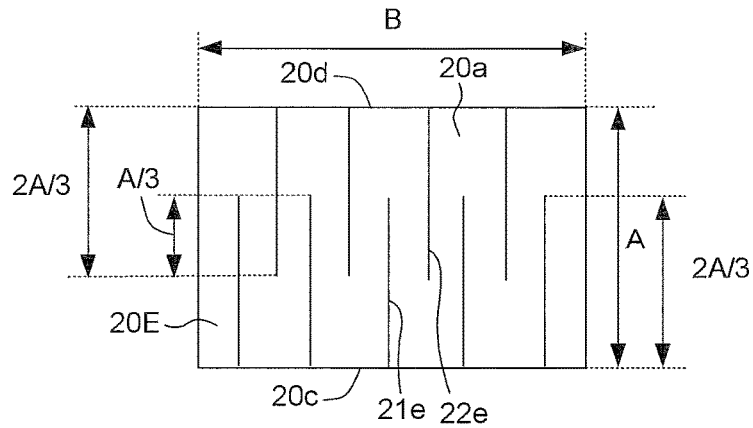
[FIG. 6B]
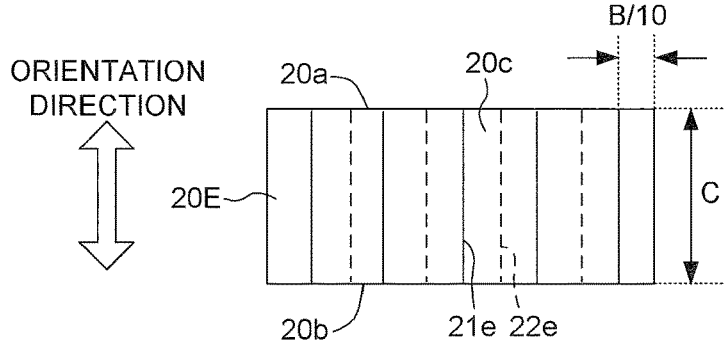

[FIG. 7A]
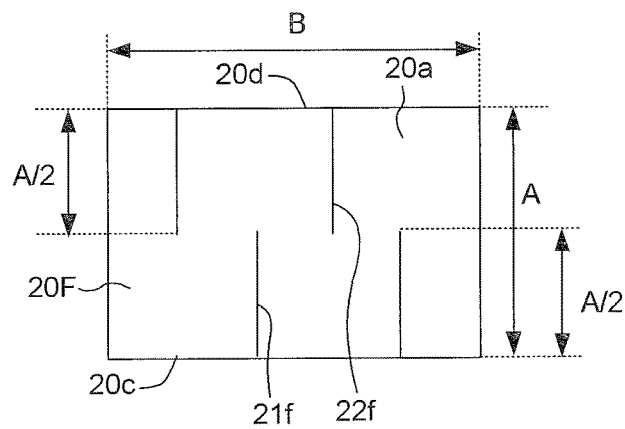
[FIG. 7B]
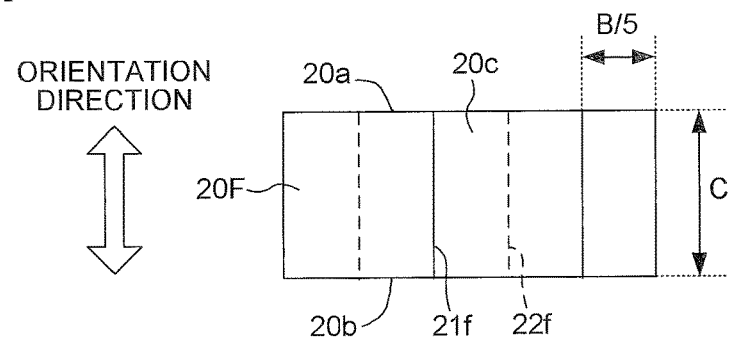
[FIG. 8A]
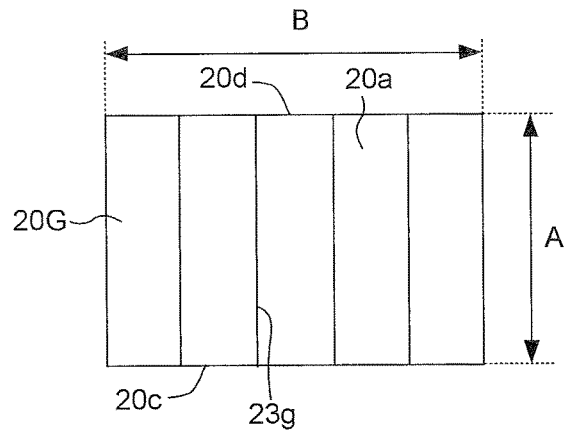
[FIG. 8B]
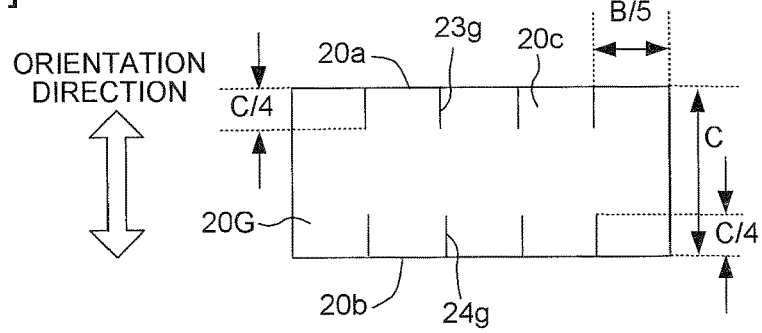

[FIG. 9A]
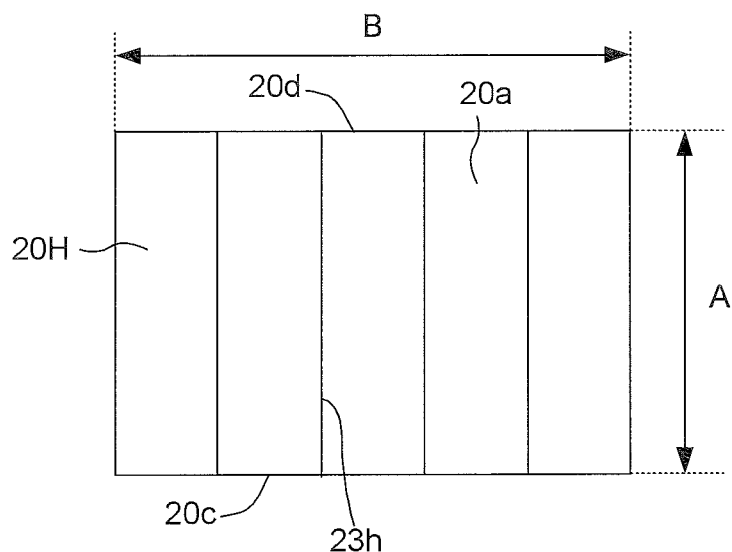
[FIG. 9B]
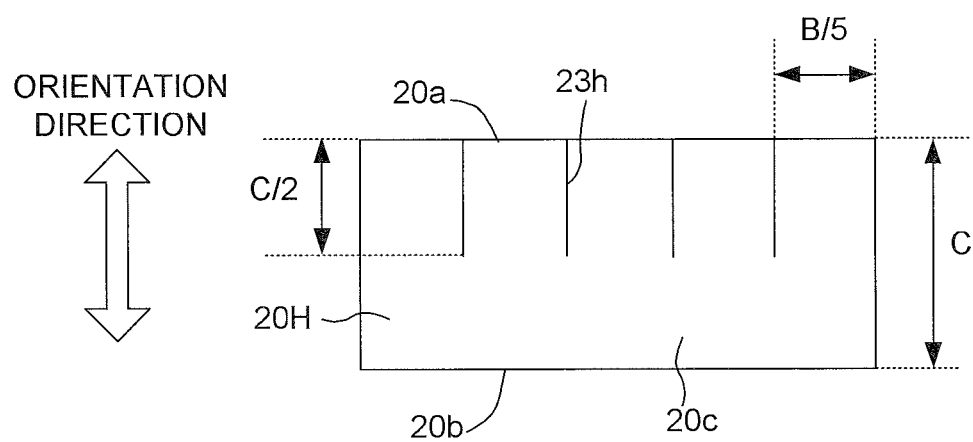

[FIG. 10]

| | MAGNET TEST PIECE | LOSS OF IRON (W/kg) | | FREQUENCY f (Hz) | |
|---|---|---|---|---|---|
| 1 | NON-PROCESSED, COATED | 96.00 | 1152.00 | 3000.00 |
| 2 | NON-PROCESSED, NON-COATED | 11.62 | 500.09 | 1933.64 |
| 3 | DIVIDED | 11.43 | 488.48 | 1900.69 |
| 4 | SLIT PATTERN 1 | 4.62 | 169.27 | 737.99 |
| 5 | SLIT PATTERN 2 | 4.54 | 201.40 | 921.47 |
| 6 | SLIT PATTERN 3 | 3.84 | 110.87 | 494.67 |
| 7 | SLIT PATTERN 4 | 5.15 | 240.13 | 1058.39 |
| 8 | SLIT PATTERN 5 | 8.55 | 426.85 | 1757.74 |
|   |                | 9.26 | 431.68 | 1701.08 |

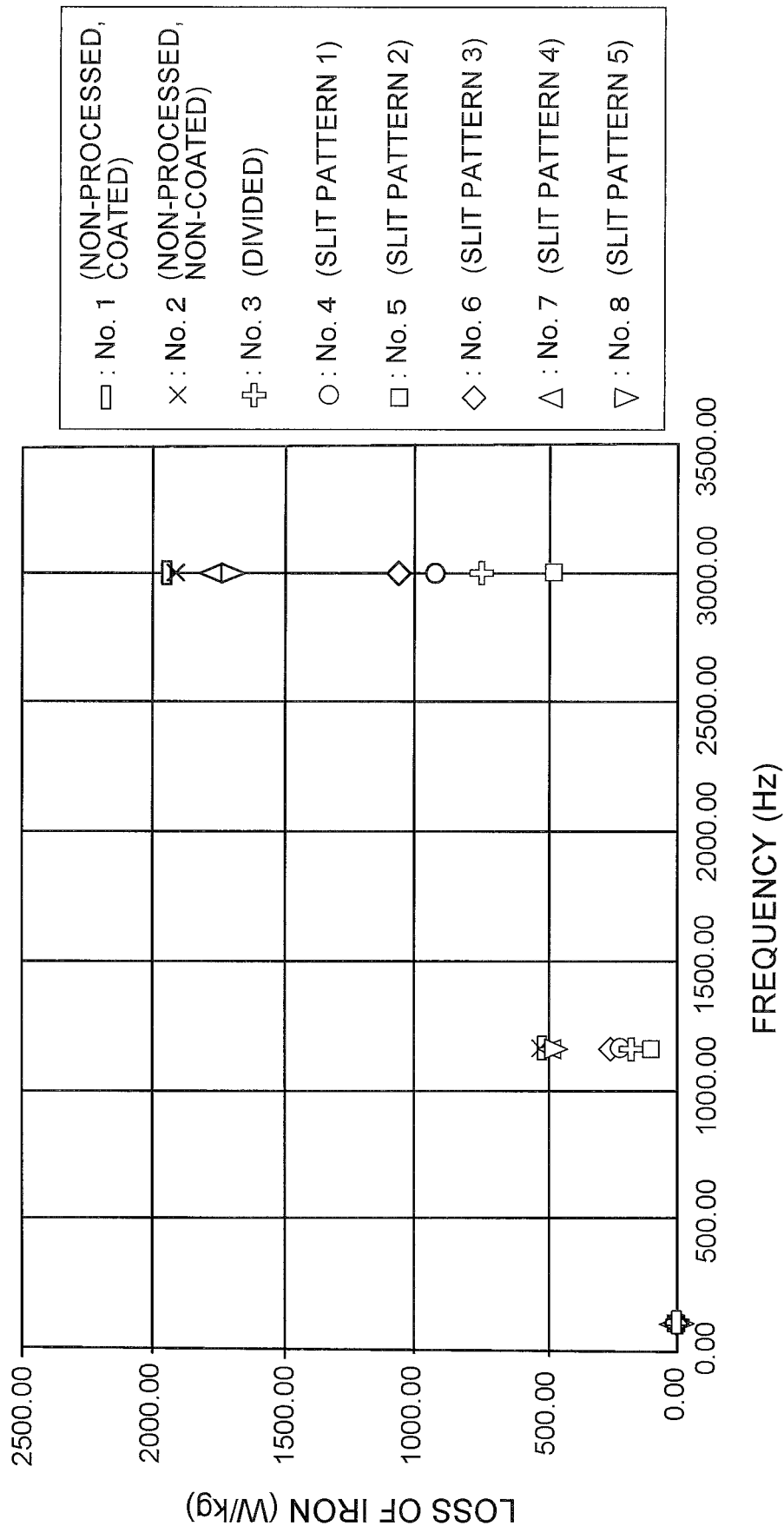
[FIG. 11]

[FIG. 12]

| STEP | DIVIDED MAGNET | SLIT MAGNET |
|---|---|---|
| PRE-STEP | SINTERING AND AGING | SINTERING AND AGING |
| 1 | CHAMFERING | CHAMFERING |
| 2 | BI-POLISHING | BI-POLISHING |
| 3 | CUT PROCESSING | SLIT PROCESSING |
| 4 | BI-POLISHING | BI-POLISHING |
| 5 | VERTICAL POLISHING | VERTICAL POLISHING |
| 6 | SURFACE POLISHING | SURFACE POLISHING |
| 7 | HALF-PRODUCT INSPECTION | — |
| 8 | PHOSPHORISE | — |
| 9 | MOVE TO ADHERING DEVICE | — |
| 10 | DEFATTING | — |
| 11 | MIXING OF ADHESIVE AND HARDENING | — |
| 12 | COAT ADHESIVE | FILL ADHESIVE |
| 13 | ADHERE | — |
| 14 | SOLIDIFY ADHESIVE | SOLIDIFY ADHESIVE |
| 15 | INSPECT | — |
| 16 | BI-POLISHING | — |
| 17 | SURFACE POLISHING | — |
| 18 | MANUAL POLISHING | MANUAL POLISHING |
| 19 | CHAMFERING | CHAMFERING |
| 20 | HALF-PRODUCT INSPECTION | HALF-PRODUCT INSPECTION |
| 21 | SET TO COATING DEVICE | SET TO COATING DEVICE |
| 22 | SPRAY COATING | ELECTROPAINT |
| 23 | SOLIDIFY COATING | SOLIDIFY COATING |
| 24 | INSPECT THICKNESS OF COATING | INSPECT THICKNESS OF COATING |
| 25 | INSPECT MAGNET PRODUCT | INSPECT MAGNET PRODUCT |

[FIG. 13]
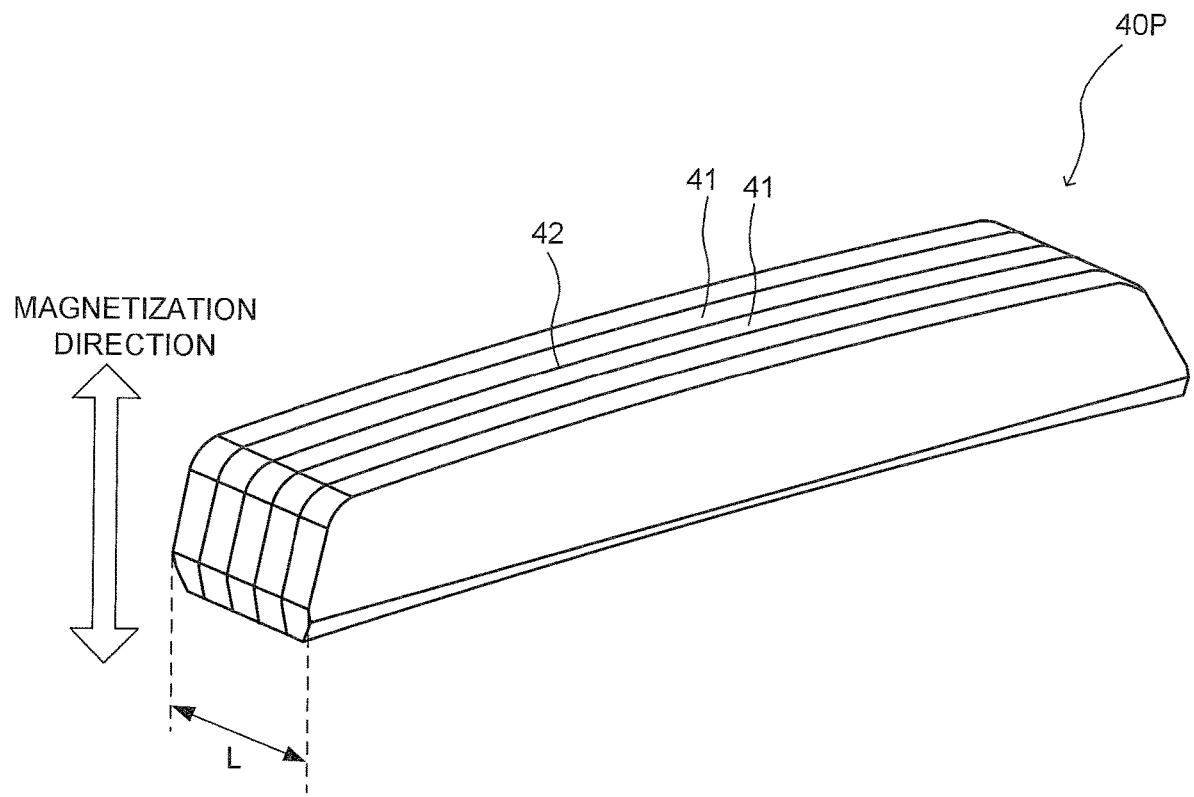
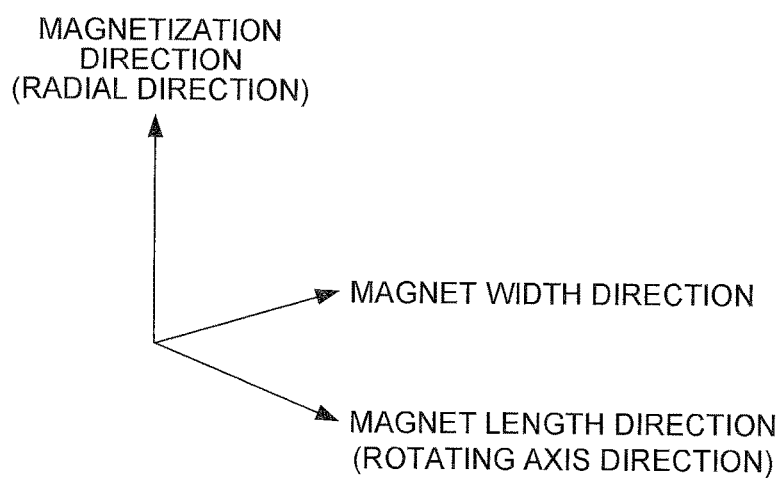

[FIG. 14]
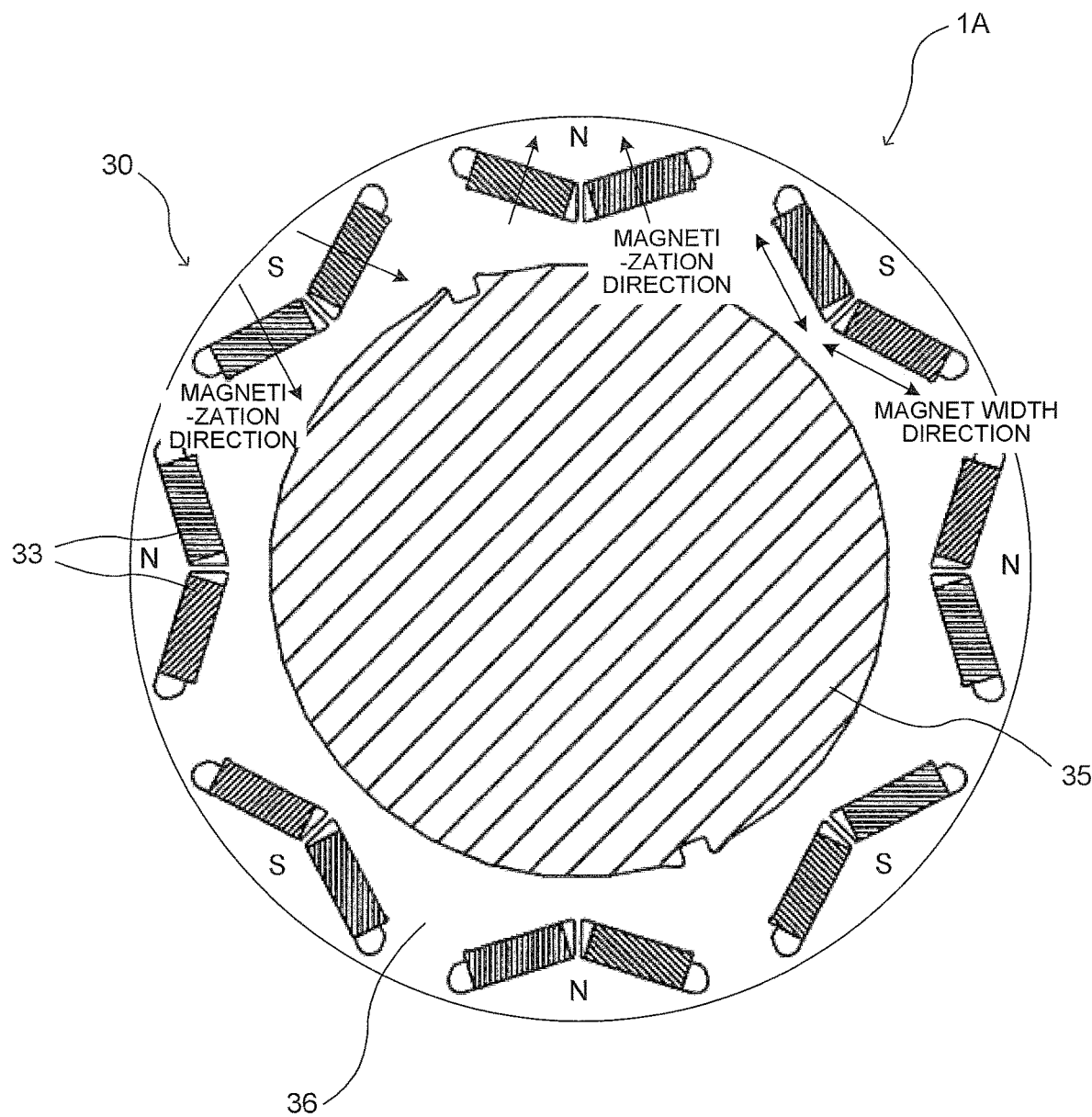

[FIG. 15]
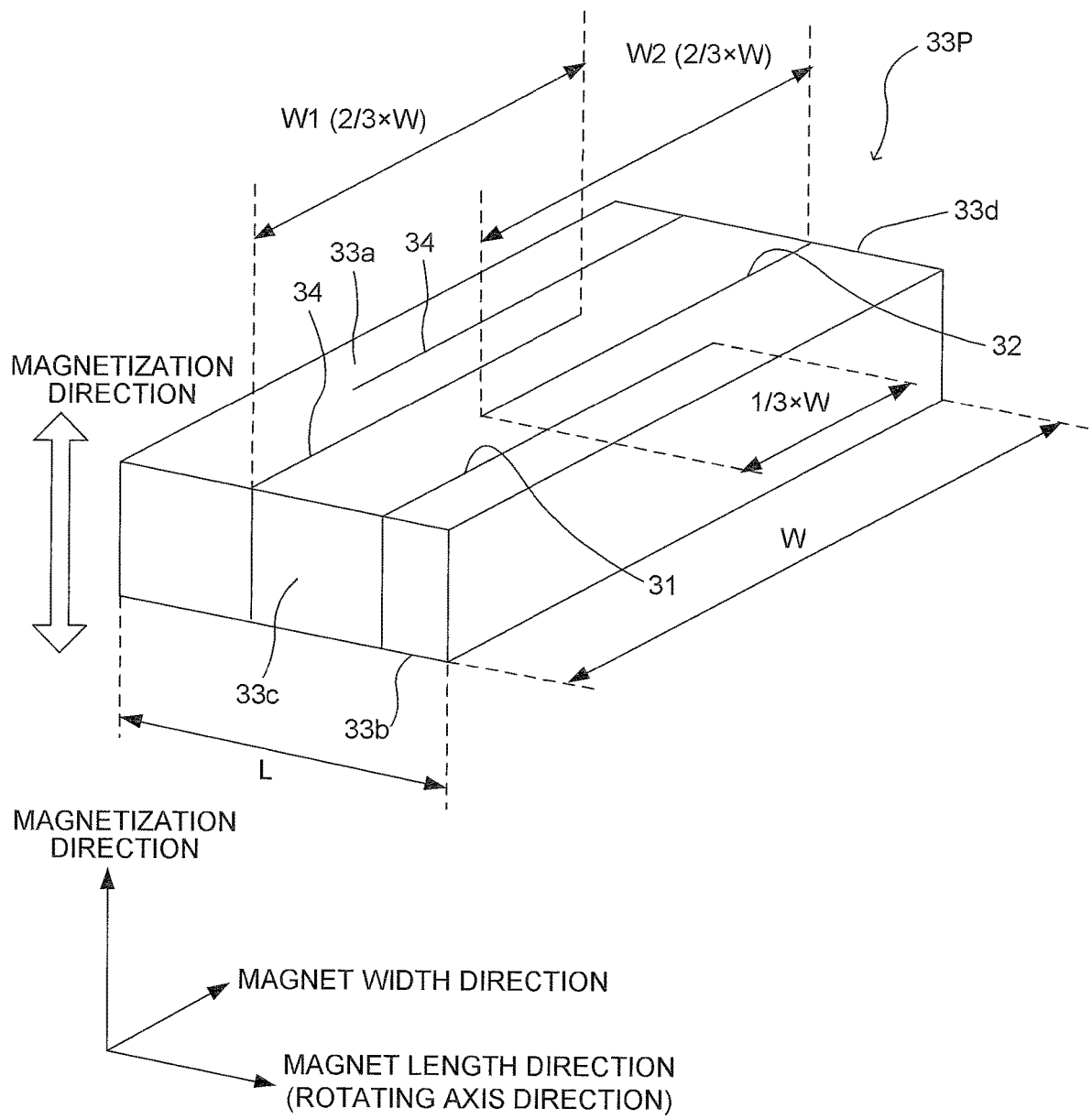

PERMANENT MAGNET FOR ROTATING ELECTRICAL MACHINE, ROTATING ELECTRICAL MACHINE, METHOD FOR PRODUCING PERMANENT MAGNET FOR ROTATING ELECTRICAL MACHINE

CROSS-REFERENCE TO RELATED APPLICATION

The present application is based upon and claims the benefit of priority to Japanese Patent Application No. 2017-051766, filed Mar. 16, 2017. The entire contents of this application are incorporated herein by reference.

BACKGROUND OF THE INVENTION

Technical Field

Embodiments of the disclosure relates to a permanent magnet for a rotating electrical machine, a rotating electrical machine, and a method for producing a permanent magnet for a rotating electrical machine.

Description of Background Art

In a permanent-magnet-type synchronous motor having a rare-earth sintered permanent magnet sintered body and an internal magnet rotor having the sintered body, slits are disposed on both an upper surface and a lower surface of the rare-earth sintered permanent magnet sintered body. The slit on one of the surfaces is disposed so that the direction thereof on the surface is perpendicular to that of the slit on the other surface.

SUMMARY OF THE INVENTION

According to one aspect of the present disclosure, a permanent magnet for a rotating electrical machine includes a magnet body. The magnet body includes a magnetization direction, a first side surface and a second side surface opposite to the first side surface in a first direction perpendicular to the magnetization direction, and at least one first slit passing through the magnet body in the magnetization direction. The at least one first slit extends in the first direction to the first side surface and not to the second side surface.

According to another aspect of the present disclosure, a rotating electrical machine includes a stator, a rotor to rotate around a rotation axis with respect to the stator, and a plurality of permanent magnets provided on an outer peripheral surface of the rotor around the rotation axis. Each of the plurality of permanent magnets includes a magnet body. The magnet body includes a magnetization direction, a first side surface and a second side surface opposite to the first side surface in a first direction perpendicular to the magnetization direction, and at least one first slit passing through the magnet body in the magnetization direction. The at least one first slit extends in the first direction to the first side surface and not to the second side surface.

According to yet another aspect of the present disclosure, a rotating electrical machine includes a stator, a rotor to rotate around a rotation axis with respect to the stator, and a plurality of permanent magnets provided inside the rotor. Each of the plurality of permanent magnets includes a magnet body. The magnet body includes a magnetization direction, a first side surface and a second side surface opposite to the first side surface in a first direction perpendicular to the magnetization direction, and at least one first slit passing through the magnet body in the magnetization direction. The at least one first slit extends in the first direction to the first side surface and not to the second side surface.

According to yet another aspect of the present disclosure, a method for producing a permanent magnet for a rotating electrical machine includes providing a sintered body that is oriented in an orientation direction and that includes a first side surface and a second side surface opposite to the first side surface in a first direction perpendicular to the orientation direction, forming at least one first slit passing through the sintered body in the orientation direction such that the at least one first slit extends in the first direction to the first side surface and not to the second side surface, and magnetizing the sintered body such that a magnetization direction substantially matches the orientation direction.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1 is a cross-sectional view showing exemplary configuration of a rotor of a rotating electrical machine related to a first embodiment;

FIG. 2 is a perspective view showing exemplary configuration of a permanent magnet disposed on the rotor;

FIG. 3A is a plan view showing exemplary configuration of magnet test pieces Nos. 1 and 2;

FIG. 3B is a side view showing exemplary configuration of the magnet test pieces Nos. 1 and 2;

FIG. 4A is a plan view showing exemplary configuration of a magnet test piece No. 3;

FIG. 4B is a side view showing exemplary configuration of the magnet test piece No. 3;

FIG. 5A is a plan view showing exemplary configuration of a magnet test piece No. 4;

FIG. 5B is a side view showing exemplary configuration of the magnet test piece No. 4;

FIG. 6A is a plan view showing exemplary configuration of a magnet test piece No. 5;

FIG. 6B is a side view showing exemplary configuration of the magnet test piece No. 5;

FIG. 7A is a plan view showing exemplary configuration of a magnet test piece No. 6;

FIG. 7B is a side view showing exemplary configuration of the magnet test piece No. 6;

FIG. 8A is a plan view showing exemplary configuration of a magnet test piece No. 7;

FIG. 8B is a side view showing exemplary configuration of the magnet test piece No. 7;

FIG. 9A is a plan view showing exemplary configuration of a magnet test piece No. 8;

FIG. 9B is a side view showing exemplary configuration of the magnet test piece No. 8;

FIG. 10 is a table showing exemplary estimation result of loss of iron;

FIG. 11 is a graph showing exemplary estimation result of loss of iron;

FIG. 12 is an explanatory diagram showing exemplary producing step of a slit magnet and a divided magnet;

FIG. 13 is a perspective view showing exemplary configuration of a divided magnet of a comparative example;

FIG. 14 is a cross-sectional view showing exemplary configuration of a rotor of a rotating electrical machine related to a second embodiment; and FIG. 15 is a perspective view showing exemplary configuration of a permanent magnet disposed on the rotor.

DETAILED DESCRIPTION OF THE EMBODIMENTS

Embodiments will be described with reference to the drawings.

1. First Embodiment (1-1. Configuration of Rotating Electrical Machine)

A description will be given of exemplary configuration of a rotating electrical machine 1 related to this embodiment with reference to FIG. 1. As shown in FIG. 1, the rotating electrical machine 1 is a rotating electrical machine of a surface permanent-magnet (SPM) type, and includes a stator (not shown) and a rotor 2 arranged inside the stator in the radial direction. The rotating electrical machine 1 is used as a generator or a motor.

The rotor 2 includes: a shaft 3 that is rotatably supported; a circular rotor iron-core 4 attached to an outer peripheral surface of the shaft 3; and a plurality of permanent magnets 10 (embodiments of the permanent magnet for the rotating electrical machine) disposed on an outer peripheral surface of the rotor iron-core 4. The permanent magnets 10 are arranged in parallel on the outer peripheral surface of the rotor iron-core 4 in the circumferential direction, and form a plurality of magnetic poles with alternate repetition of the N pole and the S pole in the circumferential direction.

The number of permanent magnets 10 is based on slot combination of the rotating electrical machine 1, and is not limited to a number (32) shown in FIG. 1.

(1-2. Configuration of Permanent Magnet)

A description will be given of exemplary configuration of the permanent magnet 10 with reference to FIG. 2. The permanent magnet 10 is configured by disposing a plurality of magnetic pieces 10P each having a predetermined axial dimension L shown in FIG. 2 in the rotating axis direction so as to have an axial dimension equal to that of the rotor iron-core 4. Note that the permanent magnet 10 may include one magnetic piece (a magnet body) 10P. As shown in FIG. 2, the magnetic piece 10P is formed as a columnar body having a substantially rectangular shape in which an axial cross-sectional shape is curved along the circumferential direction of the rotor iron-core 4. Further, the magnetic piece 10P is magnetized with the thickness direction of the rotor iron-core 4 along the radial direction as a magnetization direction.

The permanent magnet 10 (magnetic piece 10P) is a slit magnet on which a plurality of slits 11 and 12 is formed. The slit 11 is opened on a front surface 10a side located on one side (upper side in FIG. 2) in the magnetization direction and on a back surface 10b side located on the other side (lower side in FIG. 2). Further, the slit 11 is opened on a first side surface 10c side located on one side (left in FIG. 2) in a magnet width direction (an embodiment of a first direction) vertical to the magnetization direction, and is closed on a second side surface 10d side located on the other side (right in FIG. 2). The slit 12 is opened on the front surface 10a side and the back surface 10b side, opened on the second side surface 10d side, and closed on the first side surface 10c side. For convenience of a description, the slit 11 is referred to as a "first slit 11", and the slit 12 is referred to as a "second slit 12".

The first slit 11 and the second slit 12 are alternately arranged in a magnet length direction (an embodiment of a second direction) along a rotating axis direction of the shaft 3 vertical to both the magnetization direction and the magnet width direction.

The first slit 11 and the second slit 12 are formed so as to be partly overlapped in the magnet width direction. That is, the total of a dimension W1 of the first slit 11 in the magnet width direction and a dimension W2 of the second slit 12 in the magnet width direction is larger than a dimension W of the permanent magnet 10 (magnetic piece 10P) in the magnet width direction. In shown in FIG. 2, the dimension W1 of the first slit 11 in the magnet width direction is ⅔×W, and the dimension W2 of the second slit 12 in the magnet width direction is ⅔×W. As a result, the dimension of an overlapped part of the first slit 11 and the second slit 12 in the magnet width direction is ⅓×W.

The dimensions of the slits 11 and 12 are examples, and may be ones other than the above dimensions. For example, the dimensions W1 and W2 may be larger than ⅔×W. However, considering the intensity and the like of the permanent magnet 10 (magnetic piece 10P), preferably, the dimensions W1 and W2 are 9/10×W or less.

An adhesive is filled and solidified in the first slit 11 and the second slit 12. As a result, the permanent magnet 10 (magnetic piece 10P) has a resin part 13 filled in the slits 11 and 12.

(1-3. Estimation Test of Loss of Iron of Permanent Magnet)

Conventionally, in order to suppress the reduction of efficiency of a rotating electrical machine, such a method is well known that a permanent magnet installed on a rotor of the rotating electrical machine is divided in the rotating axis direction, and the divided magnets are laminated and bonded, thereby reducing the loss of iron of the permanent magnet. However, the method complicates a producing step of the permanent magnet, and thus causes the increase in costs.

Therefore, as a result of considerable research by the inventors of the present application, it has been found that in the permanent magnet for the rotating electrical machine, a part near the front surface on the side vertical to the magnetization direction has a larger effect for reducing an eddy current loss due to the slit formation than a part near the front surface on the side in the magnetization direction, and the slit magnet related to this embodiment is conceived. The inventors of the present application produced the magnet test piece and performed an estimation test of loss of iron to check the effectiveness.

(1-3-1. Configuration of Magnet Test Piece)

FIGS. 3A-9B show eight kinds of produced magnet test pieces Nos. 1-8. All the magnet test pieces Nos. 1-8, 20A-20H each contain a sintered body with the orientation, and are non-magnetized magnetic pieces. The shape and size of each of the magnet test pieces are not limited. In this example, a rectangular parallelepiped shape is provided with the following dimensions. That is, a dimension A in the magnet width direction vertical to the orientation direction is equal to 30±0.1 mm. A dimension B in the magnet length direction vertical to both the orientation direction and the magnet width direction is equal to 45±0.1 mm. A dimension C in the orientation direction is equal to 20±0.1 mm. Note that the orientation direction is a magnetization direction when the magnet is magnetized. Among the magnet test pieces Nos. 1-8, 20A-20H, excluding the magnet test piece No. 2, 20B, other magnet test pieces 20A and 20C-20H are coated, for example, with epoxy-based coating throughout the surface for the purpose of rust prevention or the like. Further, the slits of the magnet test pieces Nos. 4-8, 20D-20H are formed by, e.g., discharging processing, and the slit width is, e.g., approximately 0.15±0.01 mm. Resin, such as an epoxy-based adhesion, is filled and solidified in each of the slits, thereby sealing the slits.

As shown in FIGS. 3A and 3B, the magnet test piece No. 1, 20A and the magnet test piece No. 2, 20B are non-processed magnets to which a slit is not provided. Among the pieces, the magnet test piece No. 2, 20B is not coated on the front surface.

As shown in FIGS. 4A and 4B, the magnet test piece No. 3, 20C is a divided magnet formed by alternately bonding five divided pieces 18 that are equally divided in the magnet length direction with, e.g., adhesive layers 19 made of an epoxy-based adhesive. The dimension of each divided piece 18 in the magnet length direction is B/5.

As shown in FIGS. 5A and 5B, the magnet test piece No. 4, 20D is a slit magnet having two first slits 21d and two second slits 22d. The first slits 21d are opened on the front surface 20a side located on one side (on the front side of FIG. 5A on the paper and on the upper side in FIG. 5B) in the orientation direction and on the back surface 20b side located on the other side (on the depth side of FIG. 5A on the paper and on the lower side in FIG. 5B). Further, the first slits 21d are opened on the first side surface 20c side located on one side (on the lower side of FIG. 5A and on the front side of FIG. 5B on the paper) in the magnet width direction, and closed on the second side surface 20d side located on the other side (on the upper side of FIG. 5A and on the depth side of FIG. 5B on the paper) in the magnet width direction. The second slits 22d are opened on the front surface 20a side and the back surface 20b side, and are further opened on the second side surface 20d side and closed on the first side surface 20c side.

Both the first slit 21d and the second slit 22d have a length 2A/3 in the magnet width direction, and are alternately arranged with an interval B/5 in the magnet length direction. Further, the first slit 21d and the second slit 22d are overlapped by a length A/3 in the magnet width direction. A forming form of the slits (first slit 21d, second slit 22d) of the magnet test piece No. 4, 20D is referred to as a slit pattern 1.

As shown in FIGS. 6A and 6B, the magnet test piece No. 5, 20E is a test piece as a result of increasing the number of the first slits and the second slits in the magnet test piece No. 4, 20D. That is, the magnet test piece No. 5, 20E is a slit magnet having five first slits 21e and four second slits 22e. The first slits 21e are opened on the front surface 20a side located on one side (on the front side of FIG. 6A on the paper and on the upper side in FIG. 6B) in the orientation direction and on the back surface 20b side located on the other side (the depth side of FIG. 6A on the paper and on the lower side of FIG. 6B). Further, the first slits 21e are opened on the first side surface 20c side located on one side (on the lower side of FIG. 6A and on the front side of FIG. 6B on the paper) in the magnet width direction, and is closed on the second side surface 20d side located on the other side (on the upper side of FIG. 6A and the depth side of FIG. 6B on the paper) in the magnet width direction. The second slits 22e are opened on the front surface 20a side and the back surface 20b side, and are further opened on the second side surface 20d side and closed on the first side surface 20c side.

Both the first slit 21e and the second slit 22e have a length 2A/3 in the magnet width direction, and are alternately arranged with an interval B/10 in the magnet length direction. Further, the first slit 21e and the second slit 22e are overlapped by a length A/3 in the magnet width direction. A forming form of the slits (first slit 21e, second slit 22e) of the magnet test piece No. 5, 20E is referred to as a slit pattern 2.

As shown in FIGS. 7A and 7B, the magnet test piece No. 6, 20F is a test piece as a result of reducing the length of the first slit and the second slit in the magnet width direction in the magnet test piece No. 4, 20D. That is, the magnet test piece No. 6, 20F is a slit magnet having two first slits 21f and two second slits 22f. The first slits 21f are opened on the front surface 20a side located on one side (on the front side of FIG. 7A on the paper and on the upper side in FIG. 7B) in the orientation direction and on the back surface 20b side located on the other side (the depth side of FIG. 7A on the paper and on the lower side of FIG. 7B). Further, the first slits 21f are opened on the first side surface 20c side located on one side (on the lower side of FIG. 7A and on the front side of FIG. 7B on the paper) in the magnet width direction, and closed on the second side surface 20d side located on the other side (on the upper side in FIG. 7A and the depth side of FIG. 7B on the paper) in the magnet width direction. The second slits 22f are opened on the front surface 20a side and the back surface 20b side, and are further opened on the second side surface 20d side and closed on the first side surface 20c side.

Both the first slit 21f and the second slit 22f have a length A/2 in the magnet width direction, and are alternately arranged with an interval B/5 in the magnet length direction. The first slit 21f and the second slit 22f are not overlapped in the magnet width direction, and tip ends thereof are located in the center in the magnet width direction. A forming form of the slits (first slit 21f, second slit 22f) of the magnet test piece No. 6, 20F is referred to as a slit pattern 3.

As shown in FIGS. 8A and 8B, the magnet test piece No. 7, 20G is a slit magnet having four third slits 23g and four fourth slits 24g. The third slits 23g are opened on the front surface 20a side located on one side (on the front side of FIG. 8A on the paper and on the upper side in FIG. 8B) in the orientation direction, and closed on the back surface 20b side located on the other side (the depth side of FIG. 8A on the paper and on the lower side of FIG. 8B) in the orientation direction. Further, the third slits 23g are opened on the first side surface 20c side located on one side (on the lower side of FIG. 8A and on the front side of FIG. 8B on the paper) in the magnet width direction and the second side surface 20d side located on the other side (on the upper side in FIG. 8A and the depth side of FIG. 8B on the paper) in the magnet width direction. The fourth slits 24g are opened on the back surface 20b side and closed on the front surface 20a side, and are further opened on the first side surface 20c side and the second side surface 20d side.

The third slit 23g and the fourth slit 24g have a length C/4 in the orientation direction, and are arranged with an interval B/5 in the magnet length direction. The third slits 23g face the fourth slits 24g in the orientation direction. A forming form of the slits (third slit 23g, fourth slit 24g) of the magnet test piece No. 6, 20G is referred to as a slit pattern 4.

As shown in FIGS. 9A and 9B, the magnet test piece No. 8, 20H is a test piece as a result of omitting the fourth slit and increasing the length of the third slit in the orientation direction in the magnet test piece No. 7, 20G. That is, the magnet test piece No. 8, 20H is a slit magnet with four third slits 23*h*. The third slits 23*h* are opened on the front surface 20*a* side located on one side (on the front side of FIG. 9A on the paper and on the upper side in FIG. 9B) in the orientation direction and closed on the back surface 20*b* side located on the other side (the depth side of FIG. 9A on the paper and on the lower side in FIG. 9B) in the orientation direction. Further, the third slits 23*h* are opened on the first side surface 20*c* side located on one side (on the lower side of FIG. 9A and on the front side of FIG. 9B on the paper) in the magnet width direction and the second side surface 20*d* side located on the other side (on the upper side in FIG. 9A and the depth side of FIG. 9B on the paper) in the magnet width direction. The third slits 23*h* each have a length C/2 in the orientation direction, and are arranged with an interval B/5 in the magnet length direction. A forming form of the slits (third slit 23*h*) of the magnet test piece No. 8, 20H is referred to as a slit pattern 5.

(1-3-2. Estimation Result of Magnet Test Piece)

The inventors of the present application measured the hysteresis loss of the magnet test pieces No. 1-No. 9, 20A-20H by using a hysteresis measuring device (not shown) having an excitation power source, a shunt resistor, a magnetic flux integrator, a computer (CPU), and the like. Further, the inventors of the present application measured the eddy current loss of the magnet test pieces 20A-20H by using an eddy current measuring device (not shown) having an excitation instructing unit, a waveform transmitting unit, an excitation power source, a power meter, a digital oscilloscope, and the like. Further, the hysteresis loss and the eddy current loss were added, thereby obtaining the loss of iron. A frequency f used for measurement is, e.g., 96.00 Hz of a basic frequency, 1152.00 Hz of a carrier frequency, and 3000.00 Hz of a high frequency. FIGS. 10 and 11 show the obtained estimation result of the loss of iron.

As shown in a table of an estimation result of the loss of iron in FIG. 10 and a graph of an estimation result of loss of iron in FIG. 11, as for all the magnet test pieces Nos. 1-9, 20A-20H, as the frequency f is higher, the loss of iron is increased.

The loss of iron of the magnet test piece No. 5, 20E (slit magnet of the slit pattern 2) is 0.67 times of the loss of iron of the magnet test piece No. 3, 20C (divided magnet) at a high frequency, 0.65 times at the carrier frequency, and 0.83 times at the basic frequency, and is lower than the loss of iron of the magnet test piece No. 3, 20C at each frequency. In particular, an effect for reducing the loss of iron is large at the high frequency and the carrier frequency.

The loss of iron of the magnet test piece No. 4, 20D (slit magnet of the slit pattern 1) is 1.24 times of the loss of iron of the magnet test piece No. 3, 20C (divided magnet) at the high frequency, 1.19 times at the carrier frequency, and 0.98 times at the basic frequency. The loss of iron of the magnet test piece No. 4, 20D is slightly larger than the loss of iron of the magnet test piece No. 3, 20C at the high frequency and the carrier frequency, however, is approximately equal to that of the magnet test piece No. 3, 20C as a whole.

The loss of iron of the magnet test piece No. 6, 20F (slit magnet of the slit pattern 3) is 1.43 times of the loss of iron of the magnet test piece No. 3, 20C (divided magnet) at the high frequency, 1.42 times at the carrier frequency, and is 1.1 times at the basic frequency. At the basic frequency, similarly to the loss of iron of the magnet test piece No. 3, 20C, the loss of iron of the magnet test piece No. 6, 20F is larger the loss of iron of the magnet test piece No. 3, 20C at the high frequency and the carrier frequency, though with a relatively small amount of increase.

The loss of iron of the magnet test piece No. 7, 20G (slit magnet of the slit pattern 4) and the loss of iron of the magnet test piece No. 8, 20H (slit magnet of the slit pattern 5) are approximately 2 times or more of the loss of iron of the magnet test piece No. 3, 20C (divided magnet) at all of the high frequency, the carrier frequency, and the basic frequency.

The loss of iron of each of the magnet test piece No. 1, 20A (non-processed magnet, coated) and the magnet test piece No. 2, 20B (non-processed magnet, non-coated) is nearly 3 times of that of the magnet test piece No. 3, 20C (divided magnet), that is, extremely large at all of the high frequency, the carrier frequency, and the basic frequency.

From the above, each of the magnet test piece Nos. 4-6, 20D-20F can have the loss of iron that is relatively close to that of the magnet test piece No. 3, 20C. In particular, it is found that the loss of iron of the magnet test piece No. 5, 20E can be reduced more than that of the magnet test piece No. 3, 20C. That is, in the permanent magnet 10 (magnetic piece 10P) of the rotating electrical machine 1, an alternate arrangement interval of the slits 11 and 12 in the magnet length direction is set to approximately ½ of the dimension of the divided piece of the divided magnet in the magnet length direction, thereby obtaining an effect for reducing the loss of iron more than that of the divided magnet.

(1-4. Producing Step of Slit Magnet and Divided Magnet)

A description will be given of exemplary producing steps of the slit magnet of this embodiment and the divided magnet of the comparative example with reference to FIG. 12. Note that, a plurality of the divided magnets 40 of the comparative example is disposed so that the magnetic pieces 40P each having a predetermined axial dimension L shown in FIG. 13 are disposed in the rotating axis direction with the axial dimension equal to that of the rotor iron-core 4. Note that, the divided magnet 40 may include one magnetic piece 40P. As shown in FIG. 13, the divided magnet 40 includes a plurality of (five in the example) divided pieces 41 and an adhesive layer 42 formed by bonding the plurality of divided pieces 41 in the magnet length direction.

A description will be given of exemplary producing step of the divided magnet related to a comparative example. In the pre-step, powder of a magnetic material is press-molded, and thereafter is subjected to sintering and aging processing with a vacuum heating furnace, to produce a pillar-shaped magnetic material (sintered body) having an outer shape of a permanent magnet.

A magnetic material produced in the pre-step is subjected to chamfering (step 1) and bi-polishing (step 2). Thereafter, cut processing with discharge processing (cut processing with a wire cutter or the like is also possible) is performed (step 3), thereby dividing the magnetic material into a plurality of pieces in the magnet length direction to produce a plurality of the divided pieces. Subsequently, the divided pieces are subjected to bi-polishing (step 4), vertical polishing (step 5), and surface polishing (step 6). Once, half-product inspection of the divided pieces is performed (step 7). Subsequently, the divided pieces are phosphorised to form a phosphorised film of a coating base (step 8). The divided pieces are moved to the bonding device (step 9).

The divided pieces that are moved to the bonding device are defatted (step 10). The adhesive and a hardening are mixed to prepare, for example, a thermosetting adhesive (adhesive such as an ultraviolet curable adhesive is also possible) (step 11). The prepared adhesive is coated to a bonding surface of each of the divided pieces (step 12). The divided pieces are bonded with the adhesive (step 13) to set a form of the divided magnet. Subsequently, for example, with heating (ultraviolet irradiation or the like may be used), the adhesive is solidified (step 14). A bonding state or the like of the divided magnet is inspected (step 15).

The divided magnet is subjected to bi-polishing (step 16), surface polishing (step 17), manual-polishing (step 18), and chamfering (step 19). Subsequently, the divided magnet is subjected to half-product inspection (step 20). Subsequently, the divided magnet is installed in the coating device (step 21). A surface of the divided magnet is subjected to spray coating (step 22). Then, for example, the coating is solidified by heating (step 23). Thickness of coating is inspected (step 24). The divided magnet is subjected to final product inspection (step 25).

A description will be given of exemplary producing step of the slit magnet related to this embodiment. A pre-step is identical to that of the divided magnet.

The magnetic material produced in the pre-step is subjected to chamfering (step 1) and bi-polishing (step 2). Subsequently, the slit processing, for example, using discharge processing (slit processing with a wire cutter or the like is also possible) is performed (step 3) to form a plurality of slits in the magnetic material as a form of the slit magnet. Subsequently, the slit magnet is subjected to bi-polishing (step 4), vertical polishing (step 5), and surface polishing (step 6). Subsequently, skipping steps 7-11, the processing advances to step 12 where an adhesive is impregnated and filled in the slit (step 12). Then, step 13 is omitted, and the processing advances to step 14 where, for example, with heating (ultraviolet irradiation or the like may be used), the adhesive is solidified (step 14). Subsequently, steps 15-17 are omitted, and the processing advances to step 18. The slit magnet is subjected to manual-polishing (step 18) and chamfering (step 19). Thereafter, the slit magnet is subjected to half-product inspection (step 20).

The slit magnet is installed in the coating device (step 21), and the surface of the slit magnet is, for example, electropainted (may be spray-coated) (step 22). Note that, in the case of the divided magnet described above, the magnet is divided and cannot be electropainted. On the other hand, the slit magnet can be electropainted. Then, for example, the coating is solidified with heating (step 23), the thickness of coating is inspected (step 24), and the slit magnet is subjected to the final product inspection (step 25).

As mentioned above, with the slit magnet in this embodiment, the producing steps can be extremely reduced as compared with the divided magnet.

The magnet produced in the producing step is a non-magnetized magnet. The magnet produced as mentioned above is magnetized so that the magnetization direction matches the orientation direction, thereby producing a permanent magnet.

(1-5. Effect in First Embodiment)

As mentioned above, the permanent magnet 10 in this embodiment has at least one slit 11 and at least one slit 12 that are opened on both sides in the magnetization direction, are opened on one side in the magnet width direction vertical to the magnetization direction, and are closed on the other side thereof.

As a result, the effect for reducing the loss of iron can be improved, thereby obtaining the effect for reducing the loss of iron with the same degree of the divided magnet without dividing the permanent magnet 10. As a result, in place of the divided magnet, the slit magnet (permanent magnet 10) can be used for the rotating electrical machine 1. Therefore, it is possible to realize the permanent magnet for the rotating electrical machine that can extremely reduce costs by the simplification of the producing step.

Further, particularly in this embodiment, the permanent magnet 10 includes the first side surface 10c located on one side in the magnet width direction and the second side surface 10d located on the other side in the magnet width direction. At least one slit includes the first slit 11 that is opened on the first side surface 10c side and is closed on the second side surface 10d side, and the second slit 12 that is opened on the second side surface 10d side and is closed on the first side surface 10c side.

As a result, it is possible to form the slits 11 and 12 with a relatively large effect for reducing the eddy current loss, piercing through both the side surfaces 10c and 10d in the magnetization direction, in a direction vertical to the magnetization direction. Therefore, the effect for reducing the loss of iron can be improved.

Further, particularly in this embodiment, the first slits 11 and the second slits 12 are alternately arranged in the magnet length direction (in the rotating axis direction) vertical to both the magnetization direction and the magnet width direction.

As a result, the slit interval of the first slits 11 on the first side surface 10c and the slit interval of the second slits 12 on the second side surface 10d can be approximately equal. As a result, it is possible to suppress the unbalance of the eddy current loss occurring near the first side surface 10c and near the second side surface 10d. Therefore, the effect for reducing the loss of iron can be further improved.

Further, particularly in this embodiment, the total of a dimension W1 of the first slit 11 in the magnet width direction and a dimension W2 of the second slit 12 in the magnet width direction is larger than the dimension W of the permanent magnet 10 in the magnet width direction.

As a result, the first slit 11 and the second slit 12 can be formed to overlap with each other in the magnet width direction. As a result, the resistivity of the permanent magnet 10 in the magnet length direction (rotating axis direction) is increased, thereby further improving the effect for reducing the loss of iron.

Further, particularly in this embodiment, the permanent magnet 10 includes the resin part 13 filled in the slits 11 and 12.

As a result, it is possible to prevent the short-circuit due to incursion of a foreign matter into the slits 11 and 12. Therefore, the insulating property of the slit can be improved. Furthermore, the mechanical intensity of the permanent magnet 10 can be increased, thereby enabling the increase of the dimension and the number of slits. The effect for reducing the loss of iron can be further improved.

Further, particularly in this embodiment, the rotating electrical machine 1 includes a stator, the rotor 2, and the plurality of permanent magnets 10 installed on the outer peripheral surface of the rotor 2.

As a result, it is possible to realize the rotating electrical machine 1 of the surface permanent-magnet (SPM) type with extreme reduction in costs of the permanent magnet 10. Furthermore, in the SPM-type rotating electrical machine 1, both the side surfaces 10c and 10d (both side surfaces in the circumferential direction) in the direction vertical to the magnetization direction of the permanent magnet 10 are externally arranged on the rotor iron-core 4. Therefore, the eddy current is easily generated near both the side surfaces 10c and 10d. Therefore, in particular, for reducing the loss of iron, it is effective to form the slits 11 and 12 to the side surfaces 10c and 10d. The effect for reducing the loss of iron can be further improved.

Further, particularly in this embodiment, upon producing the permanent magnet 10 installed on the rotor 2 of the rotating electrical machine 1, a sintered body with the orientation is formed. In the sintered body, at least one slit 11 and at least one slit 12 are formed that are opened on both sides in the orientation direction, and are opened on one side in the magnet width direction vertical to the orientation direction and closed on the other side thereof. The sintered body is magnetized so that the magnetization direction matches the orientation direction.

As a result, in place of the divided magnet, the slit magnet can be used for the rotating electrical machine 1. Therefore, the following effects can also be obtained in addition to the effect for realizing the permanent magnet for the rotating electrical machine that can extremely reduce costs by simplification of the producing step.

That is, in the case of the slit magnet, the permanent magnet is not divided. Therefore, in the case of coating in the producing step, electropainting is possible to form a coating film made of coating material or resin on the magnet surface by an electrodeposition operation by using water paint or water-soluble resin as an electrolytic solution. Therefore, it is possible to realize high-quality coating with extremely small amount of color unevenness, waste, dripping, or the like as compared with spray coating with a spray gun.

Further, particularly in this embodiment, upon producing the permanent magnet 10, the adhesive is impregnated and solidified in the slits 11 and 12.

As a result, the following effect can also be obtained in addition to the effect for improving the effect for improving the insulating property of the slits 11 and 12 and for reducing the loss of iron by increasing the number or the dimension of the slits. That is, by impregnating the adhesive, it is possible to promptly fill resin to a plurality of the slits 11 and 12 at a time. Further, as for the adhesive, by using an adhesive that is hardened by an external factor (for example, ultraviolet irradiation, heating, or water in air), such as a thermosetting adhesive, a solidifying time can be reduced.

2. Second Embodiment

In the first embodiment, the description is given of the case where the rotating electrical machine is a surface permanent-magnet (SPM) type. The present disclosure can also be applied to a rotating electrical machine of an interior permanent magnet (IPM) type.

(2-1. Configuration of Rotating Electrical Machine)

As shown in FIG. 14, a rotating electrical machine 1A related to this embodiment is a rotating electrical machine of an interior permanent magnet (IPM) type, and includes a stator (not shown) and a rotor 30 arranged inside the stator in the radial direction.

The rotor 30 includes a shaft 35 that is rotatably supported, a rotor iron-core 36 attached to an external circumferential surface of the shaft 35, and a plurality of permanent magnets 33 (embodiments of the permanent magnets for the rotating electrical machine) installed inside the rotor iron-core 36. The plurality of permanent magnets 33 is each configured such that two magnets are buried in a V-shape for each magnetic pole and forms a plurality of magnetic poles with alternate repetition of the N pole and the S pole in the circumferential direction.

The number of the permanent magnets 33 is based on slot combination of the rotating electrical machine 1A, and is not limited to the number (16) shown in FIG. 14.

(2-2. Configuration of Permanent Magnet)

The permanent magnet 33 is configured by arranging, in the rotating axis direction, a plurality of magnetic pieces 33P each having a predetermined axial dimension L shown in FIG. 15 to have an axial dimension equal to that of the rotor iron-core 36. Note that the permanent magnet 33 may include one magnetic piece 33P. As shown in FIG. 15, the magnetic piece 33P is formed as a columnar body with an axial cross-sectional shape that is approximately rectangular-pillar shaped. Further, the magnetic piece 33P is magnetized with the thickness direction (vertical direction in FIG. 15) as the magnetization direction.

The permanent magnet 33 (magnetic piece 33P) is a slit magnet in which a plurality of slits 31 and 32 is formed. The slits 31 are opened on a front surface 33a side located on one side (on the upper side in FIG. 15) in the magnetization direction and on a back surface 33b side located on the other side (on the lower side in FIG. 15) thereof. Further, the slits 31 are opened on a first side surface 33c side located on one side (left in FIG. 15) in the magnet width direction (an embodiment of the first direction) vertical to the magnetization direction and closed on a second side surface 33d side located on the other side (right in FIG. 15) thereof. The slits 32 are opened on the front surface 33a side and the back surface 33b side, and are opened on the second side surface 33d side and closed on the first side surface 33c side. For the sake of convenience of a description, the slit 31 is referred to as a "first slit 31", and the slit 32 is referred to as a "second slit 32".

The first slit 31 and the second slit 32 are alternately arranged in the magnet length direction (an embodiment of the second direction) along the rotating axis direction of the shaft 35 vertical to both the magnetization direction and the magnet width direction.

The first slits 31 and the second slits 32 are formed to partly overlap with each other in the magnet width direction. That is, the total of the dimension W1 of the first slit 31 in the magnet width direction and the dimension W2 of the second slit 32 in the magnet width direction is larger than the dimension W of the permanent magnet 33 (magnetic piece 33P) in the magnet width direction. In the example shown in FIG. 15, the dimension W1 of the first slit 31 in the magnet width direction is $\frac{2}{3} \times W$, and the dimension W2 of the second slit 32 in the magnet width direction is $\frac{2}{3} \times W$. As a result, the dimension of the overlapped part of the first slit 31 and the second slit 32 in the magnet width direction is $\frac{1}{3} \times W$.

The dimensions of the slits 31 and 32 are examples, and may use others except therefor. For example, the dimensions W1 and W2 may be larger than $\frac{2}{3} \times W$. However, considering the intensity and the like of the permanent magnet 33 (magnetic piece 33P), preferably, the dimensions W1 and W2 are $\frac{9}{10} \times W$ or less.

An adhesive is filled and solidified in the first slit 31 and the second slit 32. As a result, the permanent magnet 33 (magnetic piece 33P) includes a resin part 34 that is filled in the slits 31 and 32.

With this embodiment also, in place of the divided magnet, the slit magnet (permanent magnet 33) can be used for the rotating electrical machine 1A. Therefore, the simplification of the producing step realizes a permanent magnet for the rotating electrical machine that can extremely reduce the costs.

It is noted that if terms "vertical," "parallel," "plane," etc. are used in the above description, these terms are not used in the exact meanings thereof. Specifically, these terms "vertical," "parallel," and "plane" allow tolerances and errors in design and manufacturing and have meanings of "approximately vertical," "approximately parallel," and "approximately plane."

It is noted that if terms "same," "equal," "different," etc. in relation to a dimension, a size, a shape and a position of the appearance are used in the above description, these terms are not used in the exact meaning thereof. Specifically, these terms "same," "equal," and "different" allow tolerances and errors in design and manufacturing and have meanings of "approximately the same," "approximately equal," and "approximately different."

Techniques by the embodiment and each modified example may be appropriately combined and utilized in addition to the examples having already described above. Although exemplification is not performed one by one, the embodiment and each modified example are carried out by various changes being applied thereto without departing from the technical idea of the present disclosure.

What is claimed is:

1. A permanent magnet for a rotating electrical machine, comprising
   a magnet body comprising:
      a magnetization direction;
      a first direction perpendicular to both the magnetization direction and a rotating axis direction of the rotating electrical machine;
      a first side surface and a second side surface opposite to the first side surface in the first direction;
      at least one first slit passing through the magnet body in the magnetization direction, the at least one first slit extending in the first direction to the first side surface and not to the second side surface; and
      at least one second slit passing through the magnet body in the magnetization direction, the at least one second slit extending in the first direction to the second side surface and not to the first side surface.

2. The permanent magnet according to claim 1, wherein the at least one first slit and the at least one second slit are arranged in the rotating axis direction.

3. The permanent magnet according to claim 2, wherein a total of a length of the at least one first slit in the first direction and a length of the at least one second slit in the first direction is larger than a length of the magnet body in the first direction.

4. The permanent magnet according to claim 1, further comprising:
   a resin part filled in the at least one first slit.

5. The permanent magnet according to claim 1, wherein the first side surface and the second side surface are planes substantially parallel to the magnetization direction.

6. A rotating electrical machine comprising:
   a stator;
   a rotor to rotate around a rotation axis with respect to the stator; and
   a plurality of permanent magnets provided on an outer peripheral surface of the rotor around the rotation axis, each of the plurality of permanent magnets comprising a magnet body, the magnet body comprising:
      a magnetization direction;
      a first direction perpendicular to both the magnetization direction and a rotating axis direction of the rotating electrical machine;
      a first side surface and a second side surface opposite to the first side surface in the first direction;
      at least one first slit passing through the magnet body in the magnetization direction, the at least one first slit extending in the first direction to the first side surface and not to the second side surface; and
      at least one second slit passing through the magnet body in the magnetization direction, the at least one second slit extending in the first direction to the second side surface and not to the first side surface.

7. The rotating electrical machine according to claim 6, wherein the first side surface and the second side surface are planes substantially parallel to the magnetization direction.

8. A rotating electrical machine comprising:
   a stator;
   a rotor to rotate around a rotation axis with respect to the stator; and
   a plurality of permanent magnets provided inside the rotor, each of the plurality of permanent magnets comprising a magnet body, the magnet body comprising:
      a magnetization direction;
      a first direction perpendicular to both the magnetization direction and a rotating axis direction of the rotating electrical machine;
      a first side surface and a second side surface opposite to the first side surface in the first direction;
      at least one first slit passing through the magnet body in the magnetization direction, the at least one first slit extending in the first direction to the first side surface and not to the second side surface; and
      at least one second slit passing through the magnet body in the magnetization direction, the at least one second slit extending in the first direction to the second side surface and not to the first side surface.

9. The rotating electrical machine according to claim 8, wherein the first side surface and the second side surface are planes substantially parallel to the magnetization direction.

* * * * *